(12) United States Patent
Zou et al.

(10) Patent No.: US 11,592,146 B2
(45) Date of Patent: Feb. 28, 2023

(54) LIGHT BULB APPARATUS WITH ANTENNA

(71) Applicant: XIAMEN LEEDARSON LIGHTING CO., LTD, Fujian (CN)

(72) Inventors: Renhua Zou, Fujian (CN); Chihhsien Wu, Fujian (CN); Yuankai You, Fujian (CN); Shuifa Guo, Fujian (CN); Fanglei Zhao, Fujian (CN)

(73) Assignee: XIAMEN LEEDARSON LIGHTING CO., LTD, Fujian (CN)

( * ) Notice: Subject to any disclaimer, the term of this patent is extended or adjusted under 35 U.S.C. 154(b) by 84 days.

(21) Appl. No.: 17/150,660

(22) Filed: Jan. 15, 2021

(65) Prior Publication Data
US 2021/0222838 A1   Jul. 22, 2021

(30) Foreign Application Priority Data
Jan. 16, 2020   (CN) .......................... 202020092650.4

(51) Int. Cl.
*F21K 9/238*   (2016.01)
*H05B 47/19*   (2020.01)
*F21Y 115/10*   (2016.01)

(52) U.S. Cl.
CPC ............ *F21K 9/238* (2016.08); *H05B 47/19* (2020.01); *F21Y 2115/10* (2016.08)

(58) Field of Classification Search
CPC ...... F21K 9/238; H05B 47/19; F21Y 2115/10
See application file for complete search history.

(56) References Cited

U.S. PATENT DOCUMENTS

| | | | | |
|---|---|---|---|---|
| 9,253,859 B2* | 2/2016 | Chung | ................ | F21V 23/0435 |
| 9,445,483 B2* | 9/2016 | Louh | ......................... | H01Q 9/26 |
| 10,801,675 B2* | 10/2020 | Cao | ......................... | F21V 23/005 |
| 11,226,072 B2* | 1/2022 | Zhuang | ................. | F21V 29/507 |
| 2012/0217882 A1* | 8/2012 | Wong | ......................... | F21S 4/28 |
| | | | | 315/312 |
| 2012/0274208 A1* | 11/2012 | Chen | ...................... | H05B 47/19 |
| | | | | 315/34 |
| 2016/0072176 A1* | 3/2016 | Van Dijk | .................. | H01Q 9/16 |
| | | | | 343/721 |
| 2016/0227636 A1* | 8/2016 | Sun | ......................... | F21V 17/06 |
| 2017/0142812 A1* | 5/2017 | Creemers | .............. | F21V 23/045 |
| 2018/0045388 A1* | 2/2018 | McDowell | ............... | H02G 1/00 |
| 2021/0088189 A1* | 3/2021 | You | ......................... | H05B 45/20 |
| 2022/0042655 A1* | 2/2022 | Lin | ......................... | H05K 1/00 |
| 2022/0082240 A1* | 3/2022 | Zou | ...................... | F21V 23/0435 |

FOREIGN PATENT DOCUMENTS

CN   109519728 A   *   3/2019   ............. F21K 9/232

* cited by examiner

*Primary Examiner* — Tracie Y Green
(74) *Attorney, Agent, or Firm* — Chun-Ming Shih; Lanway IPR Services

(57) ABSTRACT

A lighting apparatus includes a metal plate, an insulation layer, a light source, a driver circuit and a wireless circuit. The metal plate includes an antenna area and a base area. The antenna area and the base area are on a same plane. The insulation layer is placed on the metal plate. The insulation layer has a top side and a bottom side. The metal plate is disposed on the bottom side of the insulation layer. The light source includes a LED module. The light source is disposed on the top side of the insulation layer. The driver circuit is electrically connected to the light source via a first conductive path. The wireless circuit is electrically connected to the antenna area of the metal plate via a second conductive path.

19 Claims, 8 Drawing Sheets

LIGHT BULB APPARATUS WITH ANTENNA

FIELD

The present invention is related to a lighting apparatus, and more particularly related to a lighting apparatus with wireless function.

BACKGROUND

The time when the darkness is being lighten up by the light, human have noticed the need of lighting up this planet. Light has become one of the necessities we live with through the day and the night. During the darkness after sunset, there is no natural light, and human have been finding ways to light up the darkness with artificial light. From a torch, candles to the light we have nowadays, the use of light have been changed through decades and the development of lighting continues on.

Early human found the control of fire which is a turning point of the human history. Fire provides light to bright up the darkness that have allowed human activities to continue into the darker and colder hour of the hour after sunset. Fire gives human beings the first form of light and heat to cook food, make tools, have heat to live through cold winter and lighting to see in the dark.

Lighting is now not to be limited just for providing the light we need, but it is also for setting up the mood and atmosphere being created for an area. Proper lighting for an area needs a good combination of daylight conditions and artificial lights. There are many ways to improve lighting in a better cost and energy saving. LED lighting, a solid-state lamp that uses light-emitting diodes as the source of light, is a solution when it comes to energy-efficient lighting. LED lighting provides lower cost, energy saving and longer life span.

The major use of the light emitting diodes is for illumination. The light emitting diodes is recently used in light bulb, light strip or light tube for a longer lifetime and a lower energy consumption of the light. The light emitting diodes shows a new type of illumination which brings more convenience to our lives. Nowadays, light emitting diode light may be often seen in the market with various forms and affordable prices.

After the invention of LEDs, the neon indicator and incandescent lamps are gradually replaced. However, the cost of initial commercial LEDs was extremely high, making them rare to be applied for practical use. Also, LEDs only illuminated red light at early stage. The brightness of the light only could be used as indicator for it was too dark to illuminate an area. Unlike modern LEDs which are bound in transparent plastic cases, LEDs in early stage were packed in metal cases.

In 1878, Thomas Edison tried to make a usable light bulb after experimenting different materials. In November 1879, Edison filed a patent for an electric lamp with a carbon filament and keep testing to find the perfect filament for his light bulb. The highest melting point of any chemical element, tungsten, was known by Edison to be an excellent material for light bulb filaments, but the machinery needed to produce super-fine tungsten wire was not available in the late 19th century. Tungsten is still the primary material used in incandescent bulb filaments today.

Early candles were made in China in about 200 BC from whale fat and rice paper wick. They were made from other materials through time, like tallow, spermaceti, colza oil and beeswax until the discovery of paraffin wax which made production of candles cheap and affordable to everyone. Wick was also improved over time that made from paper, cotton, hemp and flax with different times and ways of burning. Although not a major light source now, candles are still here as decorative items and a light source in emergency situations. They are used for celebrations such as birthdays, religious rituals, for making atmosphere and as a decor.

Illumination has been improved throughout the times. Even now, the lighting device we used today are still being improved. From the illumination of the sun to the time when human can control fire for providing illumination which changed human history, we have been improving the lighting source for a better efficiency and sense. From the invention of candle, gas lamp, electric carbon arc lamp, kerosene lamp, light bulb, fluorescent lamp to LED lamp, the improvement of illumination shows the necessity of light in human lives.

There are various types of lighting apparatuses. When cost and light efficiency of LED have shown great effect compared with traditional lighting devices, people look for even better light output. It is important to recognize factors that can bring more satisfaction and light quality and flexibility.

IoT (Internet of Things) is more and more important. To activate IoT functions, it is important to add wireless functions. To add wireless function, it is important to prepare proper antennas.

However, antenna may be interfered with shielding effect. To prevent such problem, antenna may be placed in a position not covered by other components.

Such design may cause shadow or making it difficult to assembly such light device.

Therefore, it is beneficial to find a modular design that may balance the design of antenna and other manufacturing factors.

SUMMARY

In some embodiments, a lighting apparatus includes a metal plate, an insulation layer, a light source, a driver circuit and a wireless circuit.

The metal plate includes an antenna area and a base area.

The antenna area and the base area are on a same plane.

The insulation layer is placed on the metal plate.

The insulation layer has a top side and a bottom side.

The metal plate is disposed on the bottom side of the insulation layer.

The light source includes a LED module, where the light source is disposed on the top side of the insulation layer.

The driver circuit is electrically connected to the light source via a first conductive path.

The wireless circuit is electrically connected to the antenna area of the metal plate via a second conductive path.

In some embodiments, the antenna area is an elongated shape.

The elongated shape has a first end, a second end and a lateral side.

The first end is connected to the base area.

The second end is a free end.

An elongated gap is disposed between the lateral side and the base area.

In some embodiments, the metal plate is consisted of the base area and the antenna area.

The base area and the antenna area are parts of an unibody metal unit.

In some embodiments, an antenna surface of the antenna area and a base surface of the base area are on the same plane.

In some embodiments, an elongated insulation area of the insulation layer covers the antenna area.

In some embodiments, the wireless circuit is stacked upon the second conductive path.

In some embodiments, the second conductive path has an antenna electrode for electrically connecting the wireless circuit to the antenna area.

In some embodiments, an antenna excitation foil is disposed for connecting the antenna electrode to the antenna area.

In some embodiments, the second conductive path has a ground terminal for connecting the wireless circuit to a ground.

In some embodiments, the first conductive path and the second conductive path are disposed on the insulation layer.

In some embodiments, the second conductive path has an antenna excitation foil electrically connected to the antenna area of the metal plate.

In some embodiments, the wireless circuit includes a receiver circuit for receiving a first wireless signal from the antenna area and a transmitter circuit for transmitting a second wireless signal from the antenna area.

In some embodiments, the lighting apparatus may also include a covering layer.

The covering layer is made of an electrical insulation material.

The first conductive path and the second conductive path are disposed between the covering layer and the insulation layer.

In some embodiments, the covering layer has a light opening for exposing the LED module of the light source.

In some embodiments, the wireless circuit and the LED module have portions protruding above a cover surface of the covering layer.

In some embodiments, the insulation layer is placed on a top metal side of the metal plate.

The driver circuit is placed on a bottom side of the metal plate, the top metal side is opposite to the bottom metal side.

In some embodiments, the wireless circuit is integrated with the driver circuit on a driver plate.

In some embodiments, the driver plate has multiple pins passing through the metal plate and the insulation layer to insert into a socket for electrically connecting to the light source.

In some embodiments, the lighting apparatus may also include a bulb cap and a light passing cover.

The bulb cap encloses the driver plate.

The bulb cap has an Edison cap for receiving an external power supplied to the driver circuit.

The LED module emits a light passing through the light passing cover.

In some embodiments, the lighting apparatus may also include a connector ring with a first ring end connected to the light passing cover and with a second ring end connected to the bulb cap.

DETAILED DESCRIPTION

Figure 7:
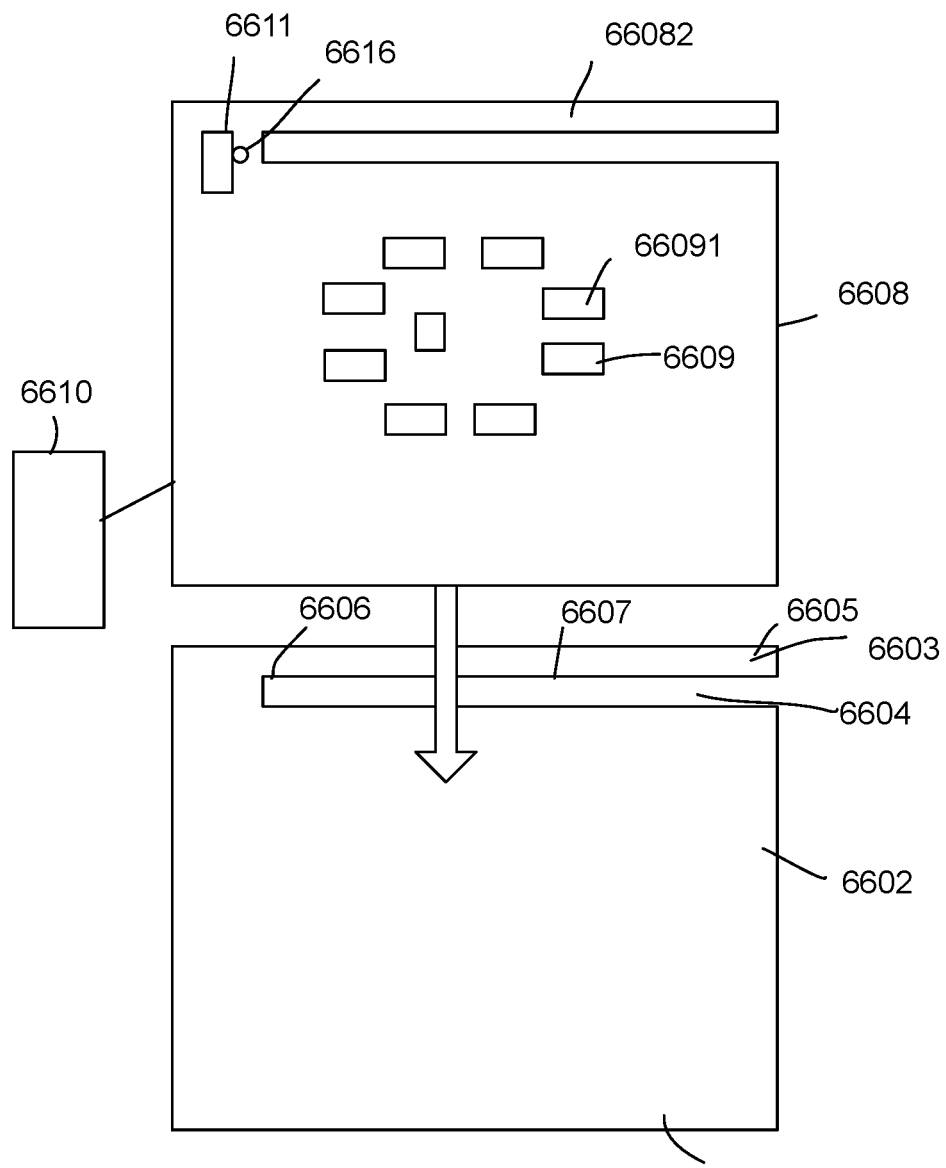
FIG. 7 shows another embodiment.
Figure 8:
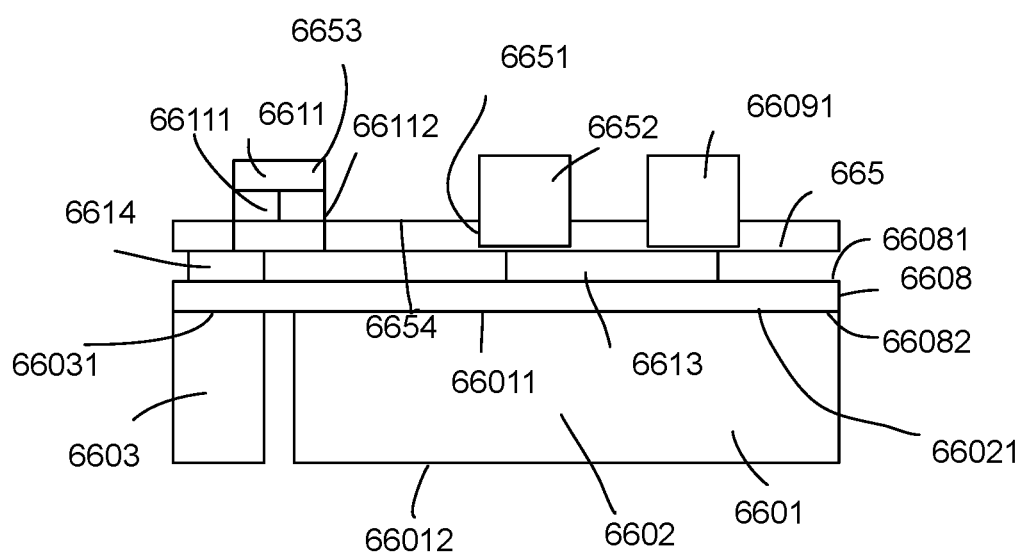
FIG. 8 shows a side view of the embodiment in FIG. 7.

Please refer to FIG. 7 and FIG. 8. FIG. 7 illustrates components of a lighting apparatus. FIG. 8 shows a side view of stacked components in the example of FIG. 7. The same reference numerals refer to the same components among different drawings and may not be repeated in description if being mentioned for brevity.

The lighting apparatus includes a metal plate 6601, an insulation layer 6608, a light source 6609, a driver circuit 6610 and a wireless circuit 6611.

The driver 6610 may be integrated with the wireless circuit 6611 or be made as a separate module from the wireless circuit 611. The wireless circuit 6611 receives a wireless command from an external device. The wireless command may be decoded and then changes a responding procedure, e.g. turning on/off the light, changing a color temperature or intensity of the light source via the driver circuit 6610.

The driver circuit 6610 may converts an external power source like 110V/220V alternating current source to a direct current source as a driving power to the LED module 66091 of the light source 6609, including rectifying, filtering or other processing.

The metal plate 6601 includes an antenna area 6603 and a base area 6602.

The antenna area 6603 and the base area 6602 are on a same plane. In some embodiments, the antenna area 6603 and the base area 6602 are made of a same metal plate with their shapes formed by using a stamping procedure for cutting unwanted area.

In other words, the metal plate 6601 is not only used as a support base for supporting the light source 6609 and the insulation layer 6608, but also used as an antenna. With such design, no matter whether the wireless circuit 6611 is disposed at the same plane of the light source 6609 or integrated with the driver circuit 6610, the antenna is well disposed, without causing a shadow while not shielded by other components.

In addition, such modular design makes manufacturing cost lowering down. The assembly of components is also enhanced.

The insulation layer 6608 is placed on the metal plate 6602.

The insulation layer 6608 has a top side 66081 and a bottom side 66082.

The metal plate 6601 is disposed on the bottom side 6082 of the insulation layer 6608.

The light source 6609 includes a LED module 66091. The light source 6609 is disposed on the top side 66081 of the insulation layer 6608.

The driver circuit 6610 is electrically connected to the light source 6609 via a first conductive path 6613.

The wireless circuit 6611 is electrically connected to the antenna area 6603 of the metal plate 6601 via a second conductive path 6614.

In some embodiments, the antenna area is an elongated shape. The extending lever 311 shows an example of such antenna area as an elongated shape. Other shapes like curved strips may be used, not limited to straight segment shape antenna.

In FIG. 7, the elongated shape has a first end 6606, a second end 6605 and a lateral side 6607.

The first end 6606 is connected to the base area 6602.

The second end 6605 is a free end.

An elongated gap 6604 is disposed between the lateral side 6607 and the base area 6602.

In some embodiments, the metal plate is consisted of the base area and the antenna area.

The base area and the antenna area are parts of an unibody metal unit.

In FIG. 8, an antenna surface 66031 of the antenna area 6603 and a base surface 66021 of the base area 6602 are on the same plane. In some embodiments, as mentioned above, the antenna area 6603 and the base area 6602 are made from the same unibody metal plate. They may share the same thickness and thus have one or two sides aligned with a same plane or same planes.

In FIG. 7, an elongated insulation area 66082 of the insulation layer 6608 covers the antenna area 6603 with similar shapes. The covering may be completely or partially covering.

In FIG. 8, the wireless circuit 6611 is stacked upon the second conductive path 6614.

In FIG. 7, the second conductive path has an antenna electrode 6616 for electrically connecting the wireless circuit 6611 to the antenna area 6603.

Figure 2:
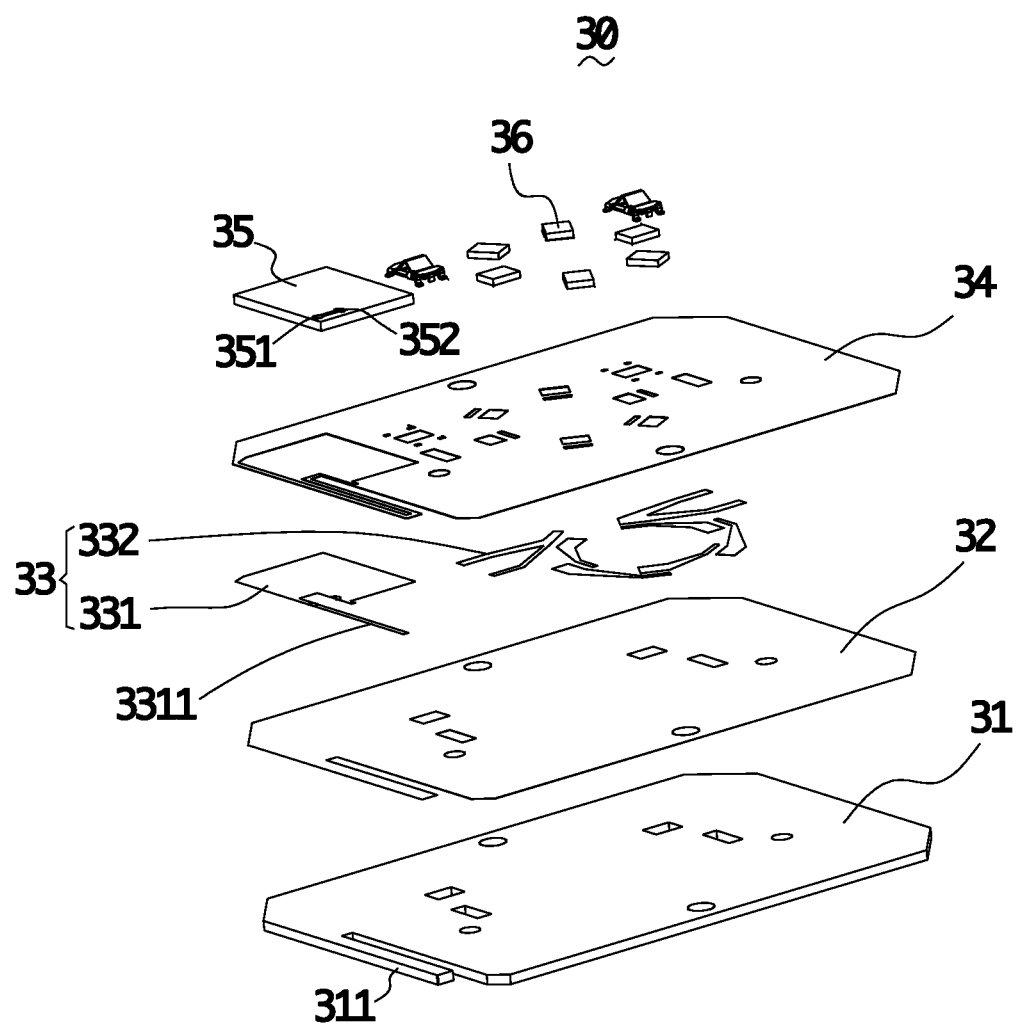
FIG. 2 illustrates an exploded view of the example in FIG. 1.

In some embodiments, an antenna excitation foil is disposed for connecting the antenna electrode to the antenna area. FIG. 2 shows an example of such antenna excitation foil 3311.

In some embodiments, the second conductive path has a ground terminal for connecting the wireless circuit to a ground. FIG. 2 shows a ground terminal for guiding the wireless circuit to ground.

In FIG. 8, the first conductive path 6613 and the second conductive path 6614 are disposed on the insulation layer 6608.

In FIG. 8, the second conductive path 6614 has an antenna excitation foil electrically connected to the antenna area 6603 of the metal plate 6601.

In FIG. 8, the wireless circuit includes a receiver circuit 66111 for receiving a first wireless signal from the antenna area 6603 and a transmitter circuit 66112 for transmitting a second wireless signal from the antenna area 6603.

In FIG. 8, the lighting apparatus may also include a covering layer 665.

The covering layer is made of an electrical insulation material.

The first conductive path 6613 and the second conductive path 6614 are disposed between the covering layer 665 and the insulation layer 6608.

In some embodiments, the covering layer 665 has a light opening 6651 for exposing the LED module 66091 of the light source.

In some embodiments, the wireless circuit and the LED module have portions 6652, 6653 protruding above a cover surface 6654 of the covering layer 665.

In FIG. 8, the insulation layer 6608 is placed on a top metal side 66011 of the metal plate 6601.

The driver circuit is placed on a bottom side 66012 of the metal plate 6601. The top metal side 66011 is opposite to the bottom metal side 66012.

Figure 6:
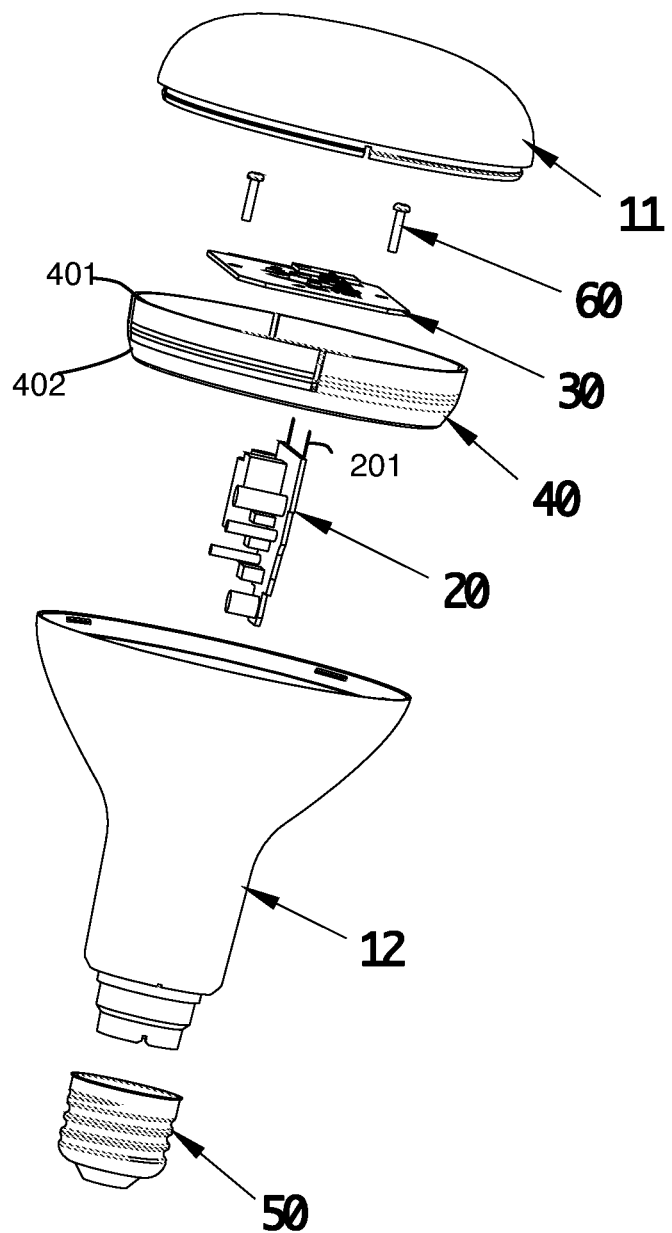
FIG. 6 illustrates an exploded view of the example in FIG. 5.

In some embodiments, the wireless circuit is integrated with the driver circuit on a driver plate. FIG. 6 shows an example that has multiple driver circuit components like filters disposed on a driver plate 20. In some embodiments, the wireless circuit mentioned above may be partly or completely disposed on the driver plate 20.

Figure 3:
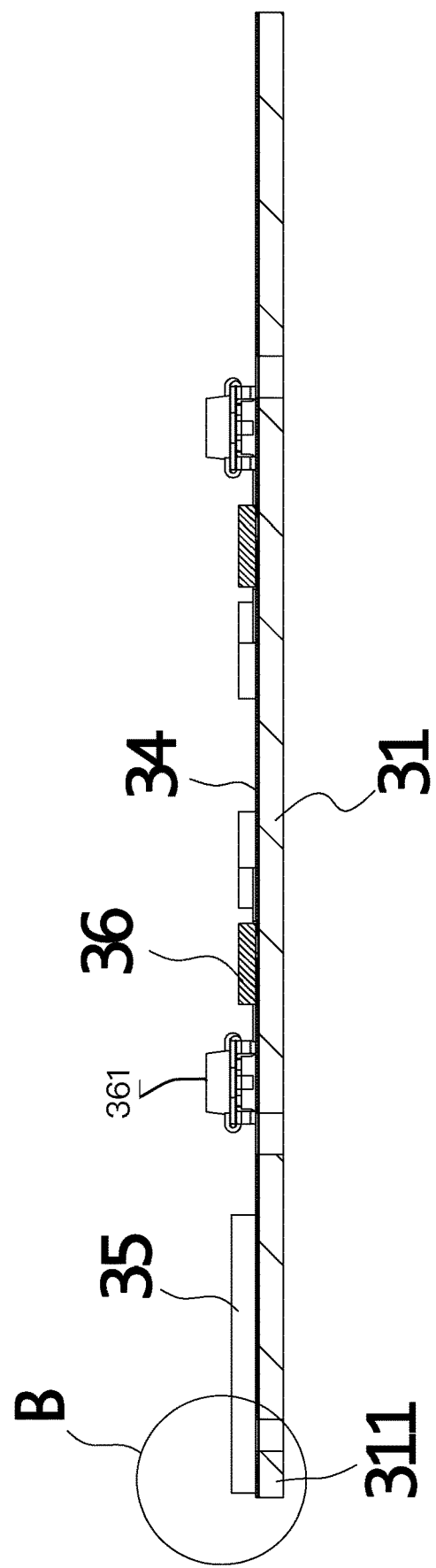
FIG. 3 illustrates a side view of the example in FIG. 1.

In FIG. 6, the driver plate 20 has multiple pins 201 passing through the metal plate and the insulation layer to insert into a socket for electrically connecting to the light source. FIG. 3 shows a socket 361 as an example. The socket may include an elastic receiver for hooking the pins when being inserted to keep electrical contact without need to welding, thus reducing manufacturing cost.

Figure 5:
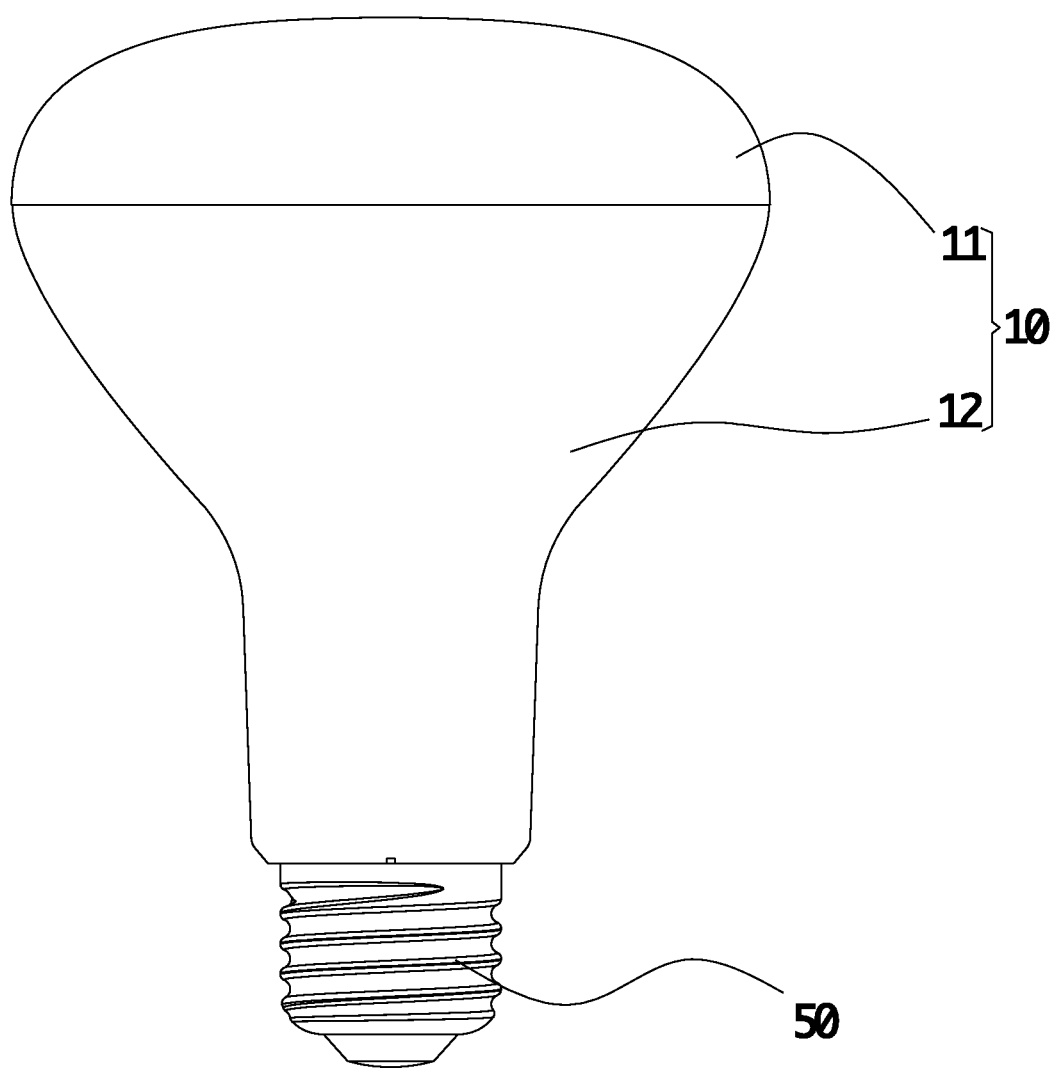
FIG. 5 illustrates a light bulb device example.

In FIG. 5 and FIG. 6, the lighting apparatus may also include a bulb cap 12 and a light passing cover 11.

The bulb cap 12 encloses the driver plate 20.

The bulb cap 12 has an Edison cap 50 for receiving an external power supplied to the driver circuit.

The LED module emits a light passing through the light passing cover.

In FIG. 6, the lighting apparatus may also include a connector ring 40 with a first ring end 401 connected to the light passing cover 11 and with a second ring end 402 connected to the bulb cap 12.

Figure 1:
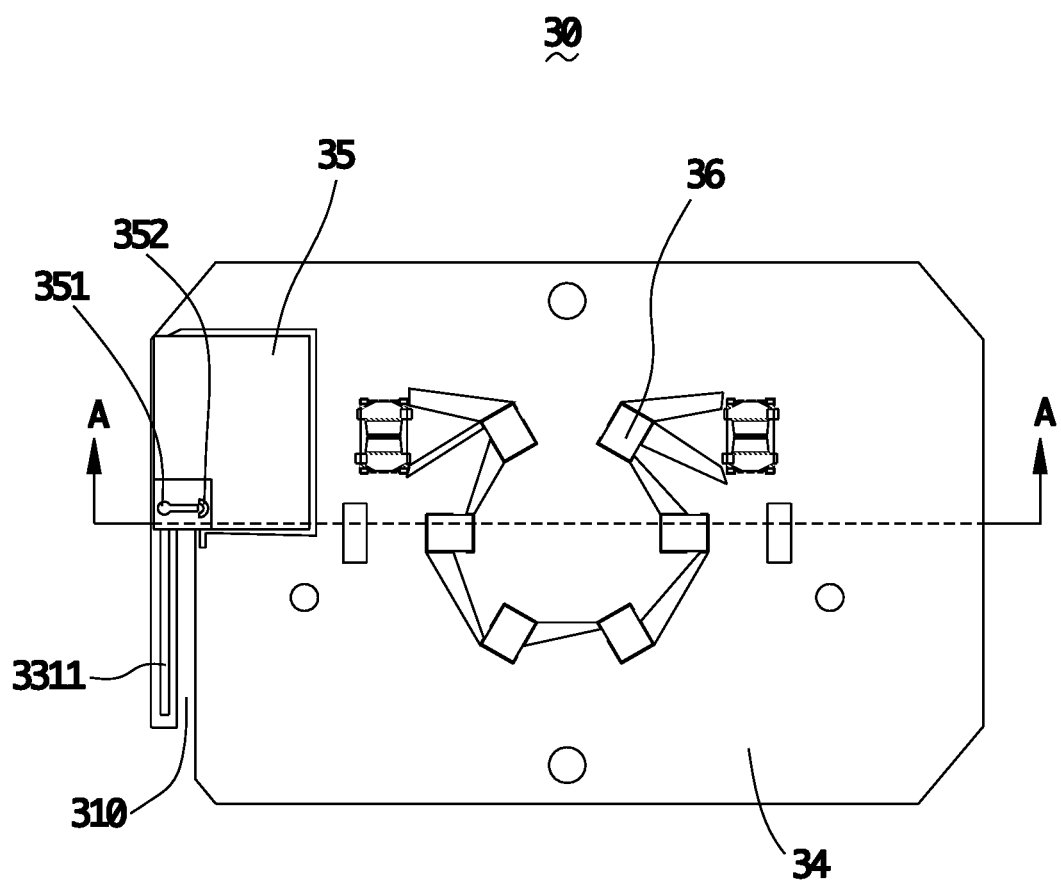
FIG. 1 illustrates a light source module example.

Please refer to FIG. 1, which shows a component in a lighting apparatus.

In FIG. 1, the module 30 includes a light source 36 and a wireless circuit 35. The wireless circuit 35 is connected to a ground terminal 352 guiding to a ground and an antenna terminal 351 guiding to an antenna area of a metal plate as mentioned above via an antenna excitation foil 3311. There is a gap 310 between the antenna area and the base area, as mentioned above. There is a covering layer 34 for covering a conductive layer with a first conductive path and a second conductive path.

FIG. 2 shows an exploded view of the example in FIG. 1.

In FIG. 2, an insulation layer 32 is placed between the metal plate 31 and the covering layer 34.

A conductive layer 33 with a first conductive path 332 and a second conductive path 331, which are made of wires or conductive film strips.

There is an antenna excitation foil 3311 for connecting to the extending metal lever 311, which serves as the antenna area mentioned above.

FIG. 3 shows a side of the components mentioned above to more particularly illustrate the spatial relation among components.

Figure 4:
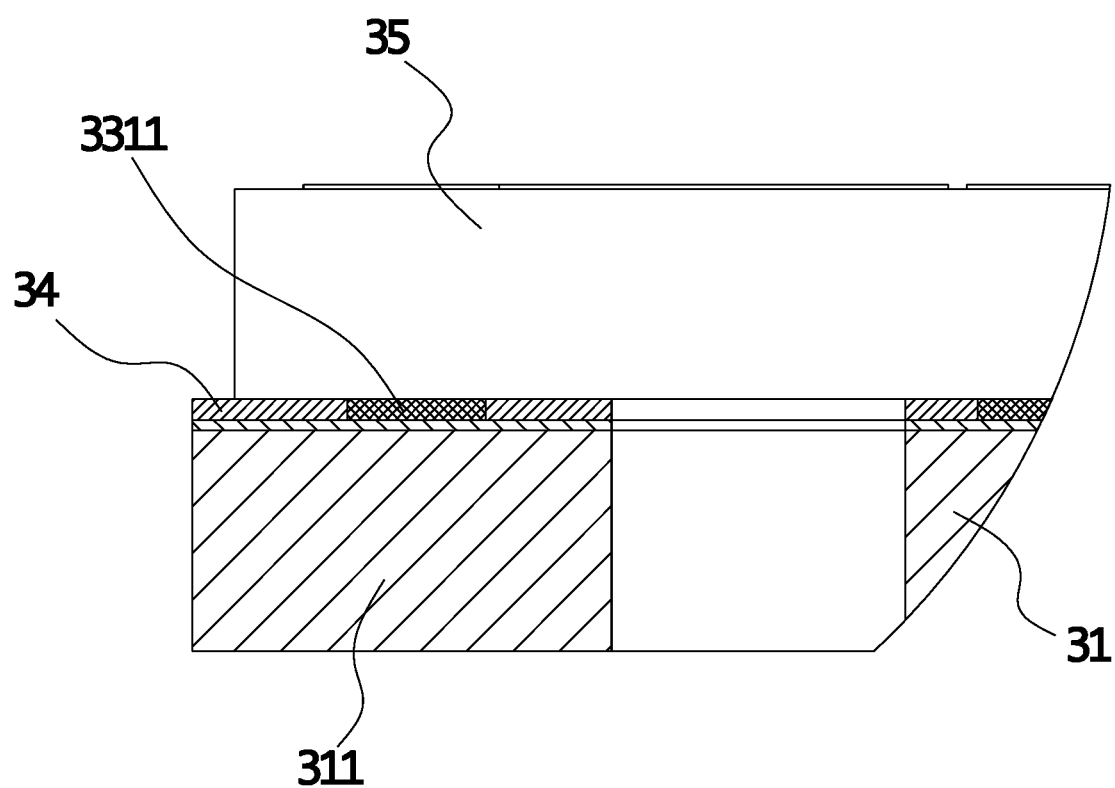
FIG. 4 illustrates a zoom-up view of a section of the example of FIG. 1.

FIG. 4 shows a zoom-up view of the components mentioned above to show how these components are stacked and integrated.

FIG. 5 and FIG. 6 shows a light bulb apparatus with component examples mentioned above to be assembled easily and efficiently as a light bulb device.

The foregoing description, for purpose of explanation, has been described with reference to specific embodiments. However, the illustrative discussions above are not intended to be exhaustive or to limit the invention to the precise forms disclosed. Many modifications and variations are possible in view of the above teachings.

The embodiments were chosen and described in order to best explain the principles of the techniques and their practical applications. Others skilled in the art are thereby enabled to best utilize the techniques and various embodiments with various modifications as are suited to the particular use contemplated.

Although the disclosure and examples have been fully described with reference to the accompanying drawings, it is to be noted that various changes and modifications will become apparent to those skilled in the art. Such changes and modifications are to be understood as being included within the scope of the disclosure and examples as defined by the claims.

The invention claimed is:

1. A lighting apparatus, comprising:
a metal plate comprising an antenna area and a base area, wherein the antenna area and the base area are on a same plane;
an insulation layer placed on the metal plate, wherein the insulation layer has a top side and a bottom side, the metal plate is disposed on the bottom side of the insulation layer;
a light source comprising a LED module, where the light source is disposed on the top side of the insulation layer;
a driver circuit electrically connected to the light source via a first conductive path; and
a wireless circuit electrically connected to the antenna area of the metal plate via a second conductive path, wherein the insulation layer is placed on a top metal side of the metal plate, the driver circuit is placed on a bottom side of the metal plate, the top metal side is opposite to the bottom metal side.

2. The lighting apparatus of claim 1, wherein the antenna area is an elongated shape, the elongated shape has a first end, a second end and a lateral side, the first end is connected to the base area, the second end is a free end, an elongated gap is disposed between the lateral side and the base area.

3. The lighting apparatus of claim 2, wherein the metal plate is consisted of the base area and the antenna area, the base area and the antenna area are parts of an unibody metal unit.

4. The lighting apparatus of claim 3, wherein an antenna surface of the antenna area and a base surface of the base area are on the same plane.

5. The lighting apparatus of claim 2, wherein an elongated insulation area of the insulation layer covers the antenna area.

6. The lighting apparatus of claim 5, wherein the wireless circuit is stacked upon the second conductive path.

7. The lighting apparatus of claim 6, wherein the second conductive path has an antenna electrode for electrically connecting the wireless circuit to the antenna area.

8. The lighting apparatus of claim 7, wherein an antenna excitation foil is disposed for connecting the antenna electrode to the antenna area.

9. The lighting apparatus of claim 6, wherein the second conductive path has a ground terminal for connecting the wireless circuit to a ground.

10. The lighting apparatus of claim 1, wherein the first conductive path and the second conductive path are disposed on the insulation layer.

11. The lighting apparatus of claim 10, wherein the second conductive path has an antenna excitation foil electrically connected to the antenna area of the metal plate.

12. The lighting apparatus of claim 11, wherein the wireless circuit comprises a receiver circuit for receiving a first wireless signal from the antenna area and a transmitter circuit for transmitting a second wireless signal from the antenna area.

13. The lighting apparatus of claim 10, further comprising a covering layer, wherein the covering layer is made of an electrical insulation material, the first conductive path and the second conductive path are disposed between the covering layer and the insulation layer.

14. The lighting apparatus of claim 13, wherein the covering layer has a light opening for exposing the LED module of the light source.

15. The lighting apparatus of claim 13, wherein the wireless circuit and the LED module have portions protruding above a cover surface of the covering layer.

16. The lighting apparatus of claim 1, wherein the wireless circuit is integrated with the driver circuit on a driver plate.

17. The lighting apparatus of claim 16, wherein the driver plate has multiple pins passing through the metal plate and the insulation layer to insert into a socket for electrically connecting to the light source.

18. The lighting apparatus of claim 16, further comprising a bulb cap and a light passing cover, wherein the bulb cap encloses the driver plate, the bulb cap has an Edison cap for receiving an external power supplied to the driver circuit, the LED module emits a light passing through the light passing cover.

19. The lighting apparatus of claim 18, further comprising a connector ring with a first ring end connected to the light passing cover and with a second ring end connected to the bulb cap.

* * * * *